(12) United States Patent
Vered et al.

(10) Patent No.: US 6,954,786 B1
(45) Date of Patent: Oct. 11, 2005

(54) METHOD AND ARCHITECTURE FOR A HIGH PERFORMANCE CACHE FOR DISTRIBUTED, WEB-BASED MANAGEMENT SOLUTIONS

(75) Inventors: Ron Vered, Sunnyvale, CA (US); Jennifer Lynn Grace, San Jose, CA (US); Abhay Rajaram, San Jose, CA (US); Arevig Antablian, Saratoga, CA (US)

(73) Assignee: 3Com Corporation, Santa Clara, CA (US)

( * ) Notice: Subject to any disclaimer, the term of this patent is extended or adjusted under 35 U.S.C. 154(b) by 669 days.

(21) Appl. No.: 09/732,977

(22) Filed: Dec. 8, 2000

(51) Int. Cl.[7] ...................... G06F 15/173; G06F 15/16
(52) U.S. Cl. ..................................... 709/223; 709/202
(58) Field of Search ............................... 709/223, 224, 709/202

(56) References Cited

U.S. PATENT DOCUMENTS

| | | | | |
|---|---|---|---|---|
| 6,003,077 A | * | 12/1999 | Bawden et al. | 709/223 |
| 6,085,243 A | * | 7/2000 | Fletcher et al. | 709/224 |
| 6,128,656 A | * | 10/2000 | Matchefts et al. | 709/223 |
| 6,427,168 B1 | * | 7/2002 | McCollum | 709/224 |
| 6,725,264 B1 | * | 4/2004 | Christy | 709/223 |
| 2003/0115314 A1 | * | 6/2003 | Kawashima | 709/224 |

OTHER PUBLICATIONS

Ron Jenkins, "Why web-based network monitoring? Leveraging the platform" published May 1999 in the International Journal of Network Management, vol. 9 Issue 3, pp. 175-183.*

Shannon, C.E. "A Mathematical Theory of Communication", The Bell System Technical Journal, vol. 27, 1948.*

* cited by examiner

*Primary Examiner*—Bharat Barot
*Assistant Examiner*—David Lazaro
(74) *Attorney, Agent, or Firm*—Reed Smith LLP; John W. Carpenter

(57) ABSTRACT

An architecture for a management information system includes a backend that services information requests from a front end. The backend retrieves data from management information base(s) (MIBs) and prepares a response to the information requests. The backend maintains a cache of data recently retrieved from the MIBs and uses the cache to retrieve data, instead of making additional requests to the MIBs. The responses may be prepared from cache data only, MIB data only, or a combination of both. The back end is preferably maintained on a same segment of a network as the MIBs. Multiple MIBs may be queried from the back end, and the backend may coordinate with back ends on other segments of the network.

29 Claims, 7 Drawing Sheets

METHOD AND ARCHITECTURE FOR A HIGH PERFORMANCE CACHE FOR DISTRIBUTED, WEB-BASED MANAGEMENT SOLUTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to network data communications. The invention is more specifically related to caching operations for increased efficiency in information flow between server and remote clients. The invention is more specifically related to network management communications.

2. Discussion of Background

Networks have become important, strategic foundations for competing in a global economy. And every day, more users and more business activities step into the network realm. Users are demanding that access to the network be delivered with the same simplicity, reliability, quality, and flexibility associated with picking up a phone and calling anywhere in the world.

In this network-centric environment, the behind-the-scenes designers and operators of networks face three concurrent challenges:

Networks are growing larger and more dispersed.

With each new user comes another PC, many of them notebooks and a growing number are scattered to remote locations, users' home offices, or all corners of the earth in the hands of mobile workers. While the initial capital cost of PCs gets a lot of attention, the greatest chunk of technology budgets goes to maintaining and managing users' connections. Lowering total cost of ownership (TCO) for a growing PC population means finding a way to simplify and automate management and troubleshooting of desktops, servers, and mobile PCs spread across the business. It also means enhancing the fault tolerance of servers so Information System (IS) staff escape the need to constantly fine-tune performance or deal with emergencies.

Networks are growing more complex.

New technologies and applications are reaching into corporate networks at an accelerating pace. More users and greedier applications are competing for bandwidth. Fully switched local networks are common. Consequently, it is growing more difficult to monitor performance and pinpoint problems. It is essential to gain increased visibility into today's complex networks.

Networks are growing more critical.

Businesses are using information technology as a competitive advantage. And those that are getting the strongest return on their investment are graduating from e-mail and office applications to business-critical, production applications-process controls, customer service, medical imaging, e-commerce and others. In these situations, near-100-percent network availability is essential-the days of overnight outages lasting up to several hours are over.

Along with this need for nonstop networks comes a need for greater control over, and information about, how traffic moves through the network. Companies are deploying applications such as enterprise resource planning (ERP), sales automaton, e-commerce, distributed training, and voice-over-IP (VoIP) at a rapid pace. This business-critical and, in the case of voice and video, delay-sensitive traffic needs to move through the network unobstructed by lower-priority activities such as e-mail or Internet browsing.

Therefore, IS managers need tools capable of providing network support for these critical business objectives on an immediate real time basis. The supporting information is preferably provided in an intuitive format that allows the managers to quickly find the needed information with simple searching and a minimum of additional research. However, because of display complexities, and lack of available tools, the data presented to IS managers is not presented as effectively as is preferred to allow quick and easy access to the data needed for making proper network management decisions.

Various network monitoring tools currently utilized to inform managers about the health of networks are know. A brief discussion of network devices, standards, the traffic crossing these networks, and some an available tools is now provided.

Networking Devices Standards

This specification presumes familiarity with the general concepts, protocols, and devices currently used in LAN networking applications and in WAN internetworking applications. These standards are publicly available and discussed in more detail in the above referenced and other co-assigned patent applications.

This specification also presumes some familiarity with the specific network and operating system components discussed briefly in the following paragraphs, including any of IEEE 802 protocol suite for Ethernet and Token-Ring LANs (including bridges), TCP/IP protocol suite (including IP routing), OSI's 7 layer communication model (including terms like PDU which is basically equivalent to an IP packet), Ethernet frame. Knowledge is presumed of the Simple Network Management Protocol (SNMP) for management of LAN and WAN networks, and reference is made to the following Internet Engineering Task Force (IETF) Internet Society RFCs 1157, 1155, 1212, 1215, (SNMPv1), RFCs 2587, 2579, 2580, 1906, 1907 (SNMPv2), and RFCs 2571, 2572, 2573, 2574 (SNMPv3), as well as associated RFCs. Knowledge is also presumed of ASN.1: Open Systems Interconnection—Specification of Abstract Syntax Notation One (ASN.1), International Organization for Standardization, and International Standards 8824, 8825. Knowledge is also presumed of the RMON MIBs defined for remote network monitoring and management as defined in RFCs 1902, 1213, 1905, 1757, 2021, and other associated RFcs.

SUMMARY OF THE INVENTION

The present inventors have realized that queries of RMON data maintained at remote or varying locations on the network prevents efficient distribution of the RMON data for network management purposes, and that a caching method for storing and distributing network management data can greatly increase the performance of network management devices by decreasing query times required for retrieval of the network management data. The present invention includes a 3 tier system for network management that includes a Front-End for requesting network management data, a Back-End that maintains a cache of recent request responses, and an agent that maintains the most recent network management data.

The present invention provides caching of network management data that is at least logically separated from other devices where the cached data is either retrieved or utilized. The present invention speeds up and eliminates or reduces otherwise associated latencies in the retrieval of network management data, and is ideally suited for the distribution of RMON data to any one or more network management programs. The invention provides further speed increases by preferably placing the Back-End device on a same segment where the agent being monitored is located. Multiple Back-End devices may be provided when the agents being monitored are located on different segments.

The present invention is an architecture for a three tier management application, comprising, a front end software tier coupled to the managed network, a database of management information coupled to said network, and a back end software server tier including a query mechanism configured to query the management information database to retrieve data related to the management data requests. A cache is utilized by the backend device to speed and reduce latency in retrieval of recently retrieved management information.

The invention includes a backend configured to be used in a web-based management application, comprising a communication mechanism configured to receive management data requests from at least one front end and send management data responses to said at least one front end, a cache, and a main processing mechanism connected to said cache and said communication mechanism, and configured to, retrieve management data from at least one of said cache and a management information database, and utilize the retrieved management data to prepare the management data responses.

The present invention may also be embodied as a method of providing management information to a front end, which can be, but is not limited to, an Internet Browser based application, comprising the steps of, receiving a management information request, determining a set of data required to respond to the management information request, querying a cache for parts of said data set are maintained in said cache, querying a management information database for parts of said data set either not maintained in said cache or maintained in said cache but stale, and preparing a response to said management information request; and sending the response to the front end.

Both the architecture and method may be conveniently implemented in software, manufactured as an IC or other configurations of electronics. When implemented in software, the invention may be executed on a specialized or general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present inventors realized that an architecture where ability to manage and monitor a network and/or various hosts in that network through a web browser running a management application ("Front-End") is sought, as (but not limited to) with the use of Sun's Java technology, performance and response time issues arise.

In an example configuration, a web browser can be launched on a remote machine, possibly connecting through a slow dial-up connection or from a remote office. In such cases, available bandwidth is limited in addition to the physical distance from the managed agent, so communication traffic between manager and agent has to flow through multiple gateways and/or other network elements each contributing to a large total latency.

For example, let us assume that in order to satisfy a single user request, the management application has to send N query requests to an RMON(RFC 2021, 2074, 2819) agent and get N responses from that agent. If bandwidth is limited, the amount of time (response time) required to transfer all of this information would increase at least linearly as N increases, linearly if there is no congestion.

An efficient protocol, where the number of Entropy bits, as defined in Shannon's information theory, is sufficiently close or equal to the number of actual encoded data bits which are communicated over the network, i.e., one that the amount of overhead is low as possible, would be used, then a shorter response time would result. In addition, if the running management application was in very close proximity to the management agent, connecting on a LAN for example or maybe even on the same physical host, then bandwidth and latency limitations would be greatly reduced. Efficiency of said protocol can be enhanced even further in terms of latency if each request-response pair encapsulates all or most of the data associated with a single user request, or where each such pair is independent of other responses made as part of this single user request ("Efficient-Protocol").

Furthermore if the agent is not expected to change a variable's value in a given time period, or if it is possible to get data change-increments, or if the data measured by a variable is not used directly, but rather used to derive the actual information presented to a user, or if it is not desired to get the agent busy responding to multiple possibly unnecessary requests, then polling and caching can be used.

It is also realized that with the ability to manage a network from anywhere, possibly remotely, network latency issues are unlikely to be avoided entirely. However, with the use of an efficient protocol and with the introduction of a middle-tier—"Back-End" that is physically positioned in close proximity, possibly even on the same host as the agent and employs a cache for storage of previous query results, performance and response time is improved significantly.

Figure 1:
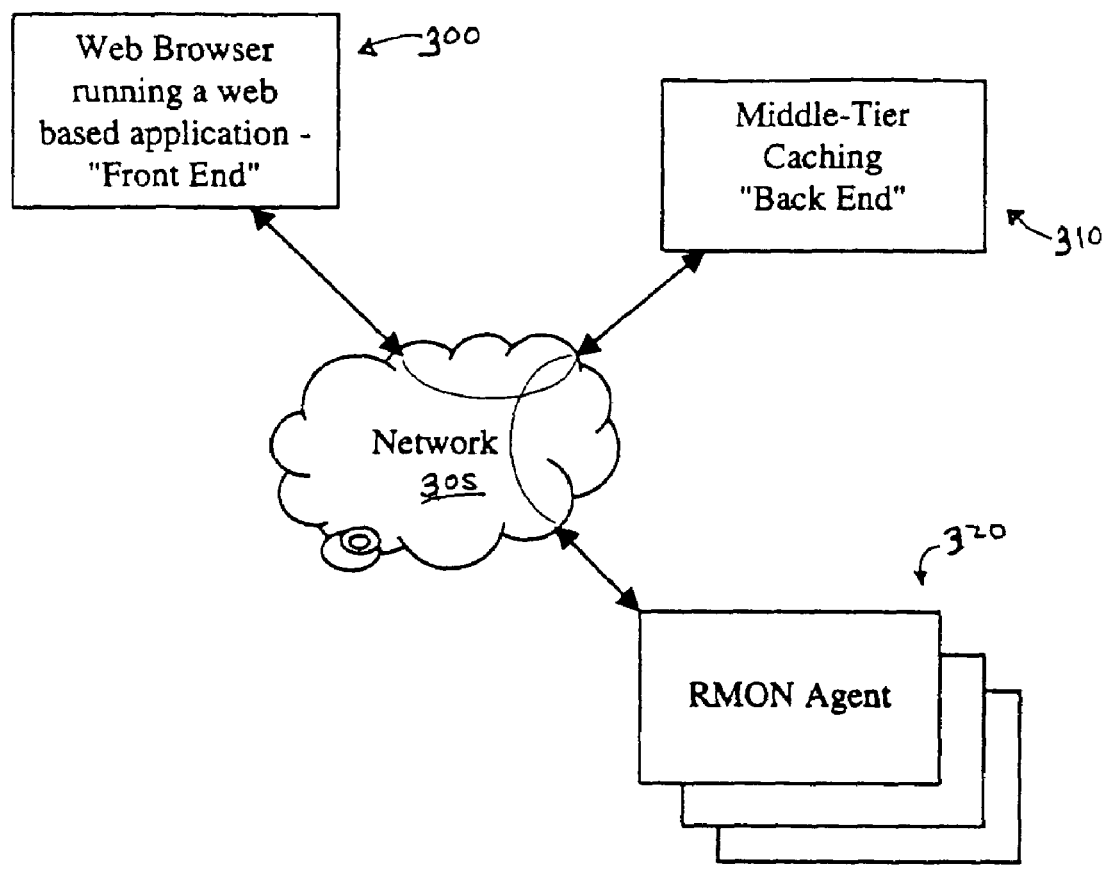
FIG. 1 is a high level block diagram of an embodiment of an architecture for a web-based network management tool, including a front-end running on a browser, a backend, and a set of RMON Agents, each connected to a network.

Referring now to the drawings, wherein like reference numerals designate identical or corresponding parts, and more particularly to FIG. 1 thereof, there is presented an architecture that includes a browser based Front-End application (Front-End) 300, and a middle tier Back-End device (Back-End) 310 running on a network 305. The Back-End 310 retrieves data from one or more data sources (RMON agents 320, for example), using the retrieved data to answer queries sent by the Front-End 300 to the Back-End 310.

Figure 2:
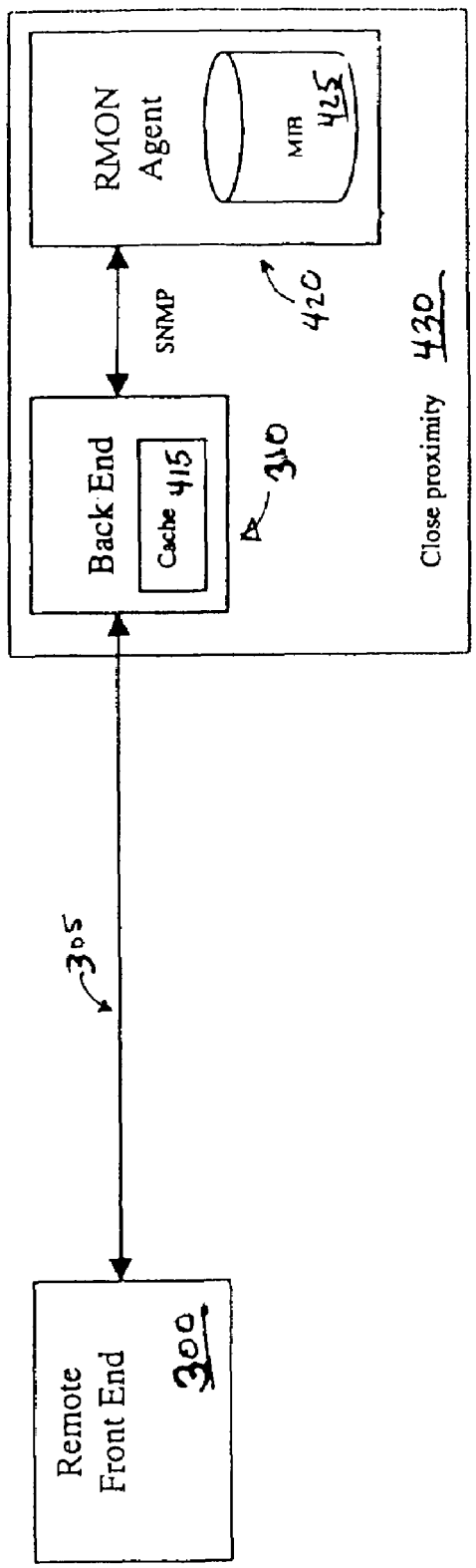
FIG. 2 is a block diagram of an embodiment of the network management architecture of FIG. 3.

Turning now to FIG. 2, the Back-End 310 includes a cache 415, which can be implemented as a memory space used for the purpose of storing these previously fetched results (retrieved data).

The Back-End 310 utilizes a high bandwidth low latency connection or connectionless protocol dialog (labeled SNMP in FIG. 2) with the RMON agent(s) to get query results fast, when required and appropriate. The Back-End 310 uses the cache 415 to make some Front-End queries even faster because data in the cache 415 is readily available and in some cases eliminates the need to go all the way to the agent, which would have increased the response time.

The Front-End 300 communicates directly with the Back-End 310 utilizing an Efficient-Protocol. This protocol improves response time because the Front-End 300 maps each user request to either a corresponding single request for the Back-End 310 or to a few independent requests and therefore does not have to wait for a response before issuing a next request, that is, Front-End 300 does not have to sequentially chain request to received responses to satisfy a user's request. Such chaining results in substantially large latency. This is possible because it is no longer required to query the agent directly, e.g. with SNMP's Get-Next.

The Back-End 310, upon reception of a Front-End request, fetches all available information from the cache 415. Information which is either stale or which was not cached is fetched from the RMON agent 420. This fetched data can now be cached to improve performance in future Front-End queries. When all required information is available, the Back-End sends a processed response back to the Front-End. This response may contain agent data, cache data and derived data sorted, ordered and serialized appropriately according to the original Front-End request.

The Back-End can now utilize periodic polling of the agent in order to:

Get only the changes since its recent poll. This improves performance because only changes are communicated between the agent and the Back-End, a significant traffic and processing reduction. All new changes are applied to the cache to keep it in a consistent state, effectively mirroring the data in the agent's MIB.

With RMON, this is possible by specifying a time filter (part of the timeMark mechanism, see RFC 2021) in the SNMP OID.

Calculate rate information or other derived information based on cached values and newly retrieved values. This derived information can now be exposed to the Front-End.

Relieve the agent from being required to answer identical or similar queries in higher rate than it has to, with a the introduction of the Back-End.

The introduction of the Back-End also simplifies the Front-End, making it light-weight, easier to download over a network and more appropriate as web application. This is because some of the functionality, previously residing in the Front-End, has now been moved to the Back-End.

The remote Front-End 300 contains a computer program or other processing that generates data requests that are communicated to the Back-End 310. The data requests are preferably formatted in the efficient protocol, which may be embodied as a set of request-response pairs. In addition, the protocol preferably supports unsolicited notifications to the front end (e.g., event based alarms such as RMON alarms, etc.).

Tables 1, 2, and 3 provide example of an implementations of request response pairs, and Table 4 provides an example header. The terms used to describe the request/response pairs are intended to be consistent with RMON standard definitions (e.g., Host, network addresses, out Octets, etc.), and the reader is referred to published RMON RFC's for additional information. However, we note that many different implementations of requests/response pairs and other communication techniques may be applied to practice the present invention, and the following tables are provided as an example.

Table 1 provides an example GetHostTopNOutOctets request response pair.

TABLE 1

GetHostTopNOutOctets

| Type Size (octets) | Field name | Comments |
|---|---|---|
| Request: | | |
| Header | | (see Table 4) |
| Response: | | |
| Header | | (see below, Data is defined on subsequent lines) |
| int 4 | Host Count | Number of hosts in response |
| For every host: | | |
| string 2+ | User Name | |
| string 2+ | Host Name | |
| int 2 | | Number of network addresses to follow |
| For every Network Address: | | |
| string 2+ | Network Address Name | |
| string 2+ | Address | |
| string 2+ | MAC address | MAC for each Host |
| int 4 | Out octets value | No. of bytes sent by host to communicate w/ the outside world |

Table 2 provides an example GetSDMatrixOutOctets request response pair (SD=Source Destination). This request response pair gives an example of using the record made when a particular machine communicates with other devices on the networks. For example, when a particular machine (see source MAC address) communicates with an http server, a record of that communication and any response received is made.

TABLE 2

GetSDMatrixOutOctets

| Type Size (octets) | Field name | Comments |
|---|---|---|
| Request: | | |
| Header | | (see below, where Data is defined on next line) |
| string 2+ | MAC address | Data field is source MAC address (an inout argument) |
| Response: | | |
| Header | | (see below, Data is defined on subsequent lines) |
| int 4 | Target Hosts | Number of target hosts to follow (Source Host specified in the request, so only target hosts are in the response). |
| For every host: | | |
| string 2+ | User Name | |
| string 2+ | Host Name | |
| int 2 | | Number of network addresses to follow |
| For every Network Address: | | |
| string 2+ | Network Address Name | |
| string 2+ | Address | |
| string 2+ | MAC address | MAC address of Target |
| int 4 | Out octets value | |

Table 3 provides an example GetPacketSizeDistribution request response pair. The Packet Size Distribution provides a number of packets histogram, based on packet sizes (e.g., 512–1024).

TABLE 3

GetPacketSizeDistribution

| Type Size (octets) | Field name | Comments |
|---|---|---|
| Request: | | |
| Header | | (see below, where Data is defined on next 2 lines) |
| string 2+ | Data source OID | RMON data src interface OID |
| int 2 | Control Index | table's control index, per above OID |
| Response: | | |
| Header | | (see below, Data is defined on subsequent lines) |
| int 8 | sizes 0–63 | packet sizes in octets |
| int 8 | sizes 64–127 | " |
| int 8 | sizes 128–255 | " |
| int 8 | sizes 256–511 | " |
| int 8 | sizes 512–1023 | " |
| int 8 | sizes 1024–1518 | " |
| int 2 | Control index | |

Table 4 provides an example Header used by the above request response pairs. The Header is defined as the concatenation of Request Header and one or more Messages.

TABLE 4

| Type Size (octets) | Field name | Comments |
|---|---|---|
| int 4 | Total length | not inclusive of this field |
| string 2+ | Probe IP | |
| int 2 | Interface ID | |

TABLE 4-continued

| Type Size (octets) | Field name | Comments |
|---|---|---|
| int 2 | Module ID | For internal use |
| int 2 | Context Length | " |
| ? | Context Length Context | " |
| int 4 | Request ID | |
| int 2 | Message ID | |
| Message Header is defined as follows: | | |
| int 2 | Message ID | command code |
| int 2 | Error code | |
| bool 2 | Encryption | |
| int 4 | Data length | message specific |
| ? | Data length | Data (varies depending on response or request). |

The requests are transmitted to the Back-End 310 on top of a transport protocol, such as TCP/IP, UDP/IP, etc. The back end device cache 415 contains cached data from previous requests. If the cached data includes information for responding to a current request, the needed information is retrieved from the cache, a response is encoded and returned to the Front-End 300. If the cache contains only part of the data needed to respond to the request, the part of the data cached is read, and an SNMP request is made to an RMON agent 420 to retrieve the remaining part of the data.

The RMON Agent 420 includes a Management Information Base (MIB) 425, which is a database of available management information regarding the monitored network (network 305, for example). The MIB 425 includes data that may be collected by the device agent 420 is embedded in (RMON device, router, switch, etc.) or data collected from multiple hosts and devices on the network. For a detailed discussion of an example embodiment of how management information may be collected from hosts and other devices on a network, the reader is directed to Fletcher et al., U.S. Pat. No. 6,085,243, entitled "Distributed Remote Management (dRMON) for Networks," other examples may be found in Grace et al., Application Ser. No. 09/732,991, entitled "Method For Correlating and Presenting Network Management Data," filed Dec. 8, 2000, the contents of each being incorporated herein by reference, in their entirety.

Preferably, the Back-End 310 is maintained in close proximity 430 to the RMON agent 420. Close proximity includes arranging the Back-End 310 as close as possible (in network terms) to the RMON agent 420, for example, keeping the Back-End 310 and RMON agent on a same segment of the network. The close proximity 430 reduces network latencies and therefore, all other factors being equal, results in faster response times for the SNMP requests. Although SNMP is used to be consistent with RMON standards, if the MIB 425 is constructed as a different type of information store, other protocols may be used.

The Back-End 310 is programmed with more intelligence than the level required to query the RMON agent 420 (retrieve data from MIB 425) based on Front-End requests. The Front-End may request a piece of data that is not directly retrievable from the RMON agent 420 or MIB 425. In this case the Back-End may need to query multiple variables or tables of RMON data, most commonly making a series of queries, and sorting, summing and encoding all properly associated data retrieved to derive a response to the Front-End request. Examples of this Back-End process of servicing a request can be found in the above referenced U.S. Patent, Grace et al.

The invention may be practiced with multiple RMON agents. The Back-End 310 also makes decisions as to which of the RMON agents need to be queried to find the data needed to determine the appropriate response to the Front-End requests.

In one embodiment, where RMON agents are spread out across different segments of the network, an additional Back-End device is installed on each segment. In this case, a master backend device may be assigned to coordinate Front-End requests, and forwarding the requests to the appropriate Back-End device, which retrieves the needed RMON data and forwards it to the master Back-End for further processing and formatting of the response to the Front-End. Alternatively, the Front-End device has enough intelligence to send requests to each of the pertinent Back-End devices, and then perform any needed associations or other processing to determine the requested data.

Figure 3:
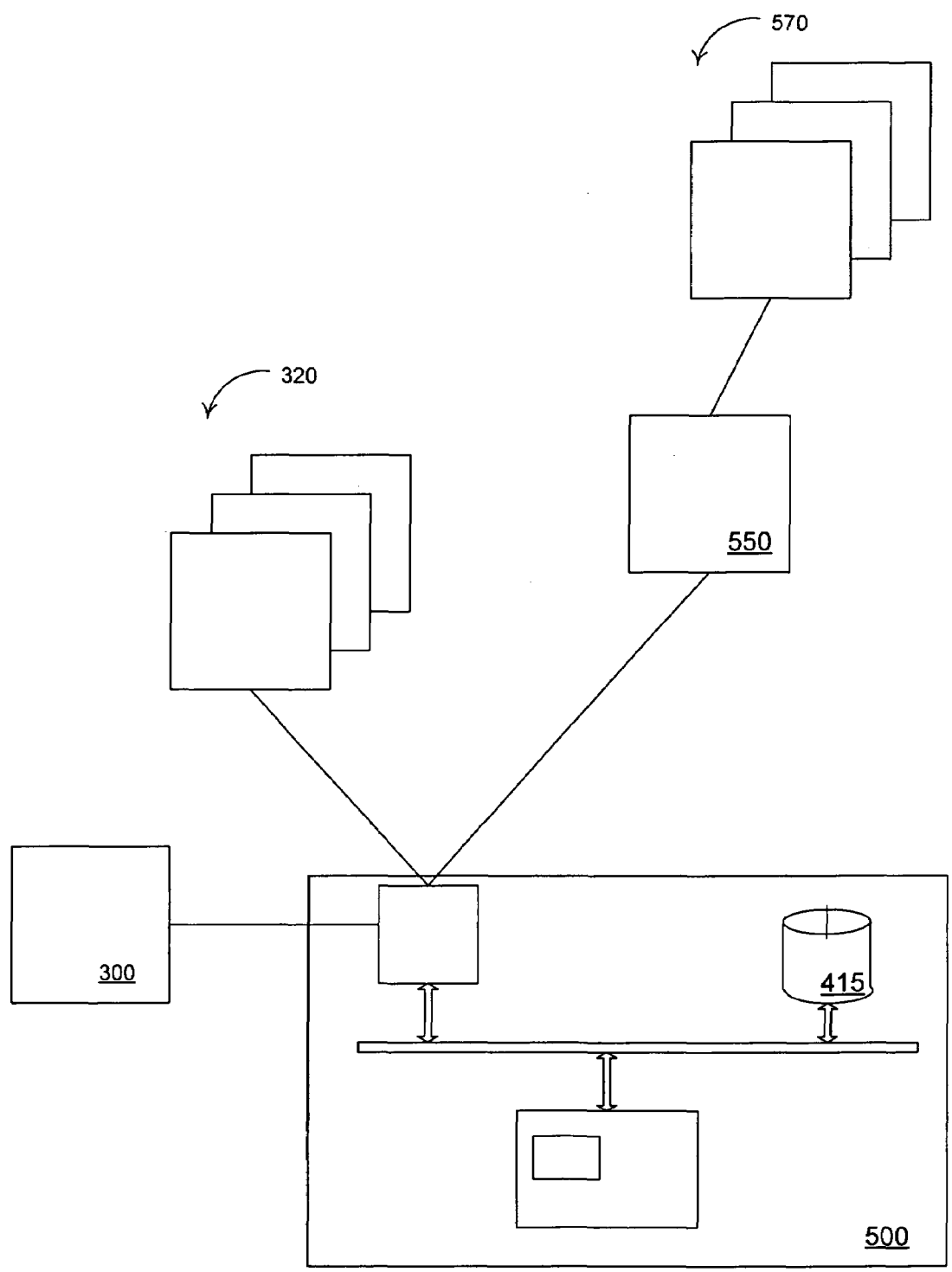
FIG. 3 is a block diagram of an embodiment of the present invention utilizing multiple RMON agents and multiple back end devices.

FIG. 3 illustrates one embodiment of multiple Back-Ends. In FIG. 3, a master Back-End host device 500 that receives management data requests from Front-End 300, which contains a cache 415. Said host process and respond to the management data requests.

The host also communicates with the RMON Agents 320, as required, to retrieve data needed to respond to the management data requests. In addition, a second Back-End device 550, located on another segment of the network, is also communicated with.

The master Back-End 500 may decide to delegate the service of all or part of a request to the second Back-End 550, possibly to multiple Back-Ends. Those would service the request, as described above, and reply with a response. The master Back-End 500 will then do the necessary processing and encoding and send a response to the Front-End 300.

Figure 4:
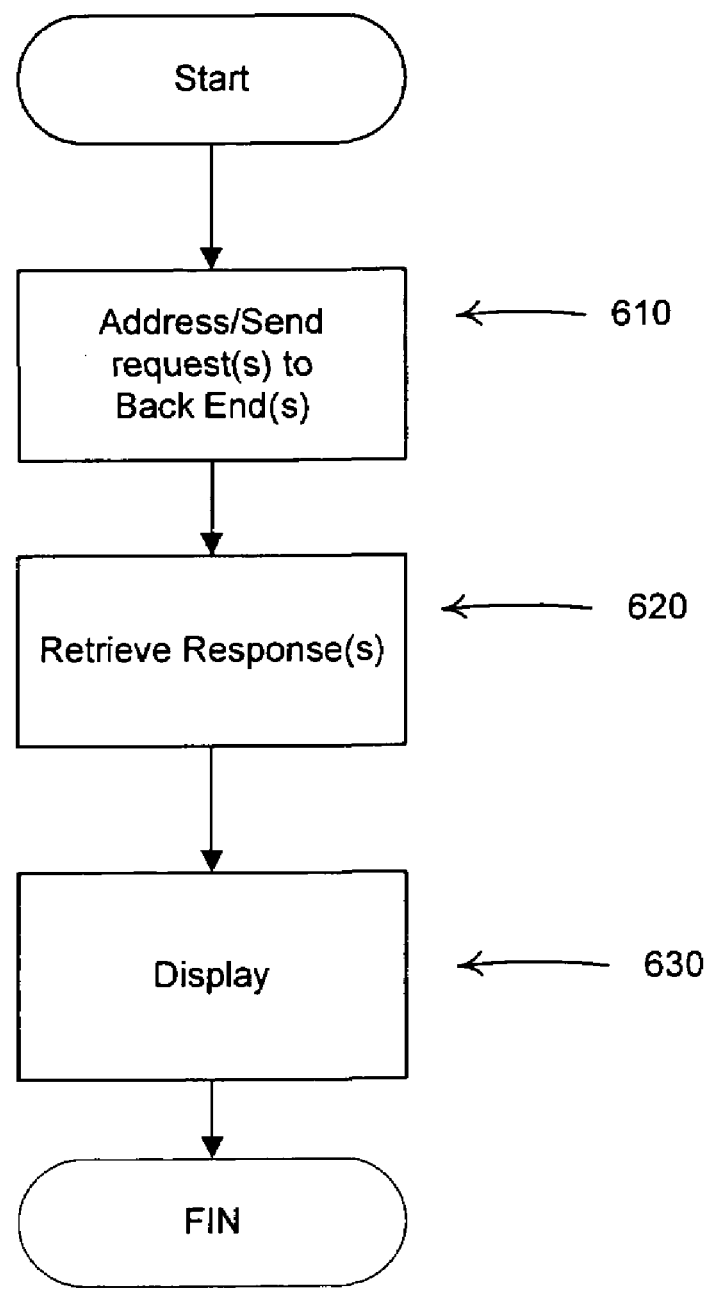
FIG. 4 is a high level flow chart of an embodiment of a Front-End request and response process according to the present invention.

FIG. 4 is a high level flow chart of an embodiment of a Front-End request and response process according to the present invention. At step 610, a Front-End device sends one or more requests to a Back-End device. Each request is preferably an independent request part of a request/response pair (see Table 1, for example). The multiple requests may be sent to one, or a set of Back-End devices.

At step 620, the response part of the request response pair, as prepared and sent by the Back-End is retrieved. Both the request and response are communicated between the Front-End and Back-End on top of a transport protocol (TCP/IP, for example). And, at step 630, the information from the response is utilized to produce a user display or other result. In one embodiment the data retrieved from the backends is directly indicative of the items to be displayed or used in other processes of the Front-End. In other embodiments, the data retrieved from the backend is in need of further processing before being utilized for display, etc. Example network management displays that may be presented based on the response data are provided in the above referenced patents.

Figure 5:
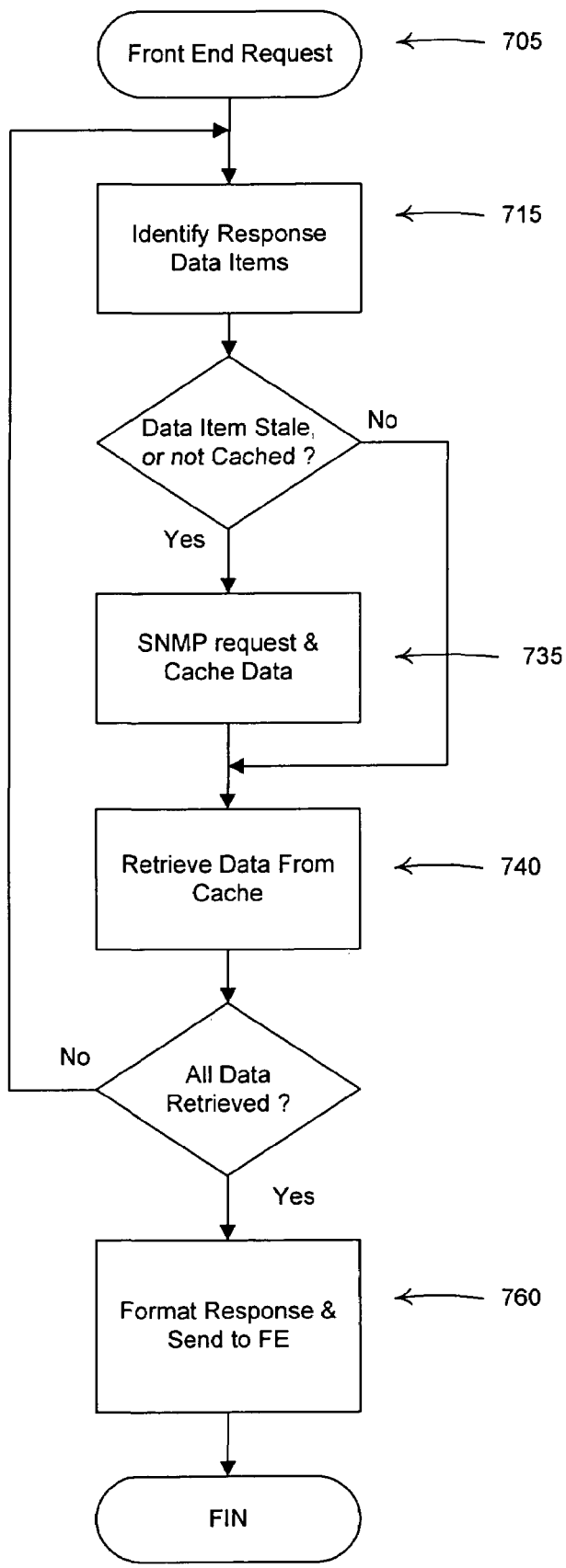
FIG. 5 is a flow chart of an embodiment of a Back-End request processing process according to the present invention.

FIG. 5 is a flow chart of an embodiment of request processing performed by the Back-End according to the present invention. The backend receives a Front-End request (step 705). The backend analyzes the request to determine data needed to service the request (step 715). In some cases, the needed data may require a search of a specific RMON data value that is then used as a reference point to search further RMON entries (for example, using the specific RMON data value as an entry point to a table maintained in the RMON MIB).

After determining the needed data items, the Back-End looks to the local cache (cache 415, for example) to determine if any of the needed data is present. If the data is present, it is also determined if the data is recent enough to be used (step 715)(stale data is re-freshed before use). If the data item is either not cached or stale, at step 735, an SNMP request is made to one or more RMON agents (e.g., querying MIB data). Data returned from the SNMP request is then entered into the cache. Alternatively, the returned data is directly input into a response encoding step, and the process of entering the returned data into the cache is done in a parallel or subsequent step.

At step 740, the non stale, previously cached data is retrieved from the cache. If all of the needed data items have not yet been retrieved, the process loops back and performs subsequent retrievals from cache, or SNMP gets, until all the needed data items are retrieved. In addition, any intermediate processing of retrieved data is also performed during this step.

Finally, at step 760, the needed data items are encoded and sent to the Front-End as a response to the Front-End request. Further processing or encoding of the data (combined with processing, if any, performed in step 740) may be used to find the exact information needed to fulfill the Front-End request, prior to encoding the response as a message. The encoded response is then sent on top of any network transport protocol (TCP/IP, for example).

Figure 6:
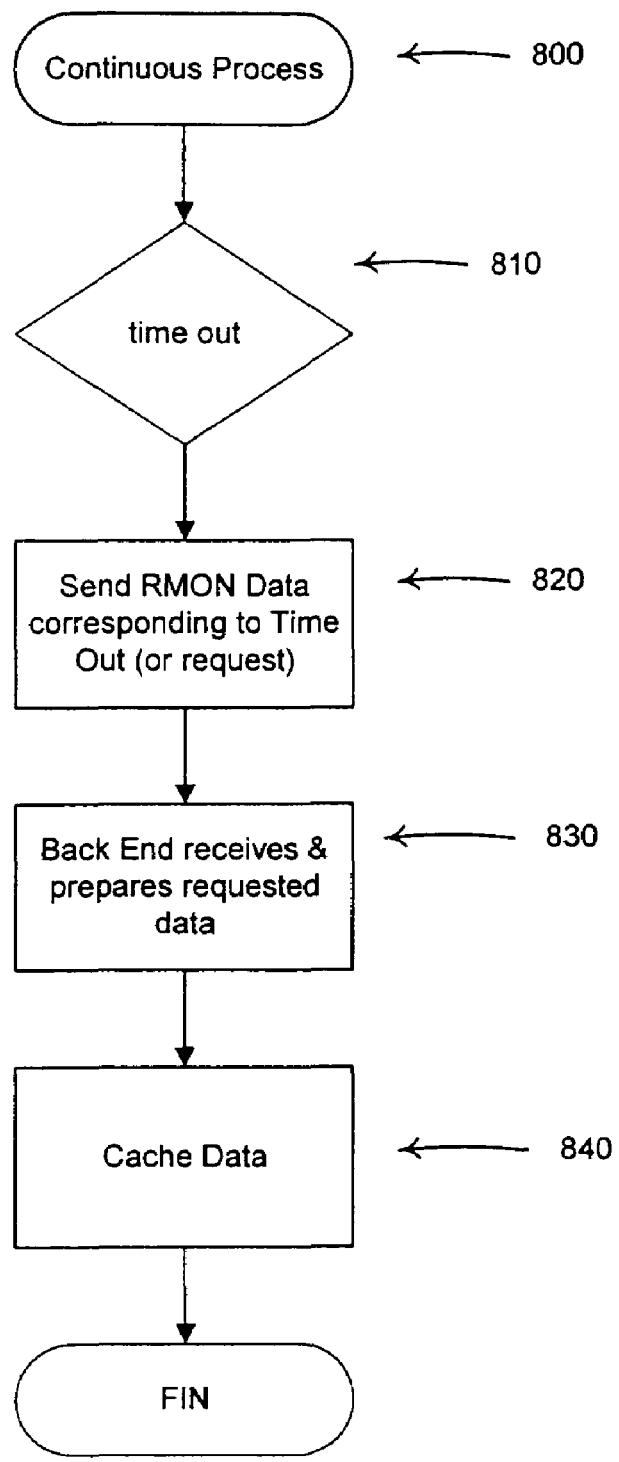
FIG. 6 is a flow chart of an embodiment of a cache updating procedure according to the present invention.

FIG. 6 is a flow chart of an embodiment of a cache updating procedure according to the present invention. Cache updating is a continuous process, as identified in start area 800. The cache is updated as described in FIG. 5 as required for fulfilling Front-End requests. In addition, other events, or a regular schedule may trigger updates of the cache.

At step 800, after a certain configurable amount of time has elapsed, a cache refresh is performed on a subset or all of the cached information. Step 810 may occur on the Back-End device, which then sends a series of one or more SNMP queries, with one or more sent in parallel and with one or more such parallel batches chained sequentially to SNMP responses to retrieve data for refreshing the cache.

To refresh the cache, data is sent from the RMON agent (Agent 420, for example) to the Back-End (step 820). The cache refresh may be all data in the cache, a pre-selected portion of MIB data (selected based on factors such as likelihood of use, recency of use, rate of change to, degree of difficulty or amount of time required to get the data from the RMON MIB, etc.). In addition, other processing or aggregation of data within the cache may also be performed based on similar factors, to assure fast cache access to the relevant data when requested (step 830). Then, at step 840, the update data is stored in the cache.

The present invention may be conveniently implemented using a conventional general purpose or a specialized digital computer or microprocessor programmed according to the teachings of the present disclosure, as will be apparent to those skilled in the computer art.

The values placed in the cache are any of the network data points needed to provided network management information, or other data displayed or used by the Front-End. Example data is described in the above referenced patents, including bytes per second of network traffic, applications traffic, network protocol traffic, for each of hosts of other devices on the network.

Figure 7:
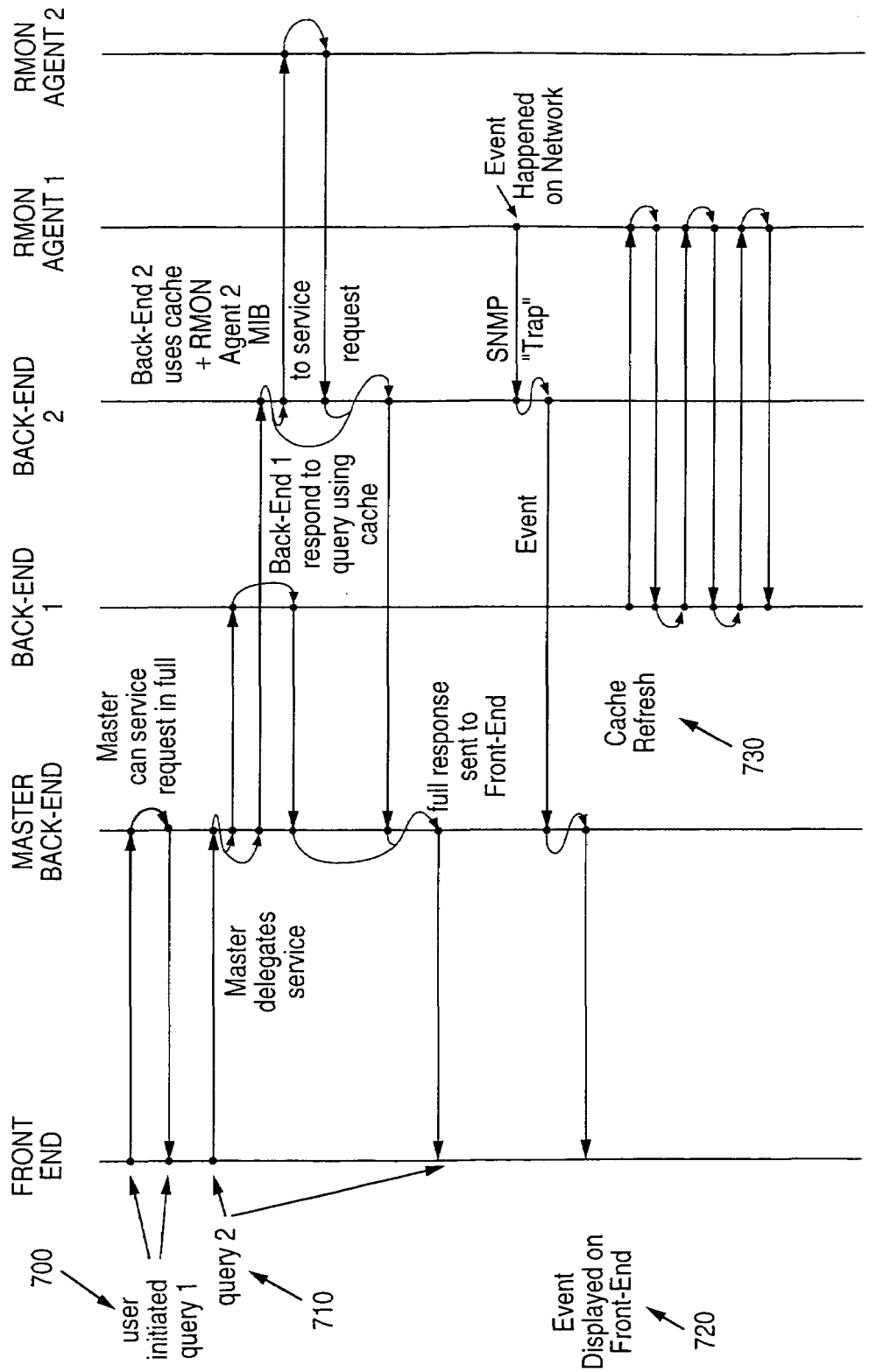
FIG. 7 is an event diagram that illustrates example queries, event, and cache updates according to an embodiment of the present invention.

FIG. 7 provides an event diagram with a high level view of example queries 700/710, an event 720, and a cache refresh 730. Example query 700 begins with a user initiated query which goes to the Master Back End that services the entire request (using the Master Back End cache). Example query 710 begins with a user initiated request and the Master Backend delegates the request across Back End #1 and Back End #2. Back End #1 responds to its portion of the delegated request using cache, and Back End #2 responds to its portion of the delegated request using cache and RMON Agent 2.

The event 720 is initiated by an event that occurred on the network, and is recorded in RMON Agent 1. An SNMP trap brings the event to a Back End (Back End #2 in this example) which sends the event to the Master Backend where it is then forwarded and displayed on the Front End.

Cache refresh 730 illustrates retrieval of information from an RMON Agent 1, and storing the retrieved data in a cache on a Back End 1. The retrieved information is an update to items previously stored in the cache.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory Ics), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, application software, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, preparing Front-End requests, caching operations, including, retrieving data from cache, retrieving data from cache and RMON data sources, updating cache, testing cache data for recency, and updating stale data, calculating rate information based on new and previously cached data, setting time filters for cache updates, distibuting Front-End requests to multiple Back-End devices, querying multiple RMON MIB devices to determine recent data and/or update cache, and the display, storage, or communication results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An architecture for a management system, comprising:
    a front end coupled to a network, comprising,
    a user interface configured to retrieve user inputs, and display management data, and
    a front end communications mechanism configured to send management data requests and receive management data responses,
    wherein the displayed management data is derived from the management data responses;
    a database of management information coupled to said network; and
    a back end comprising,
    a back end communications mechanism configured to receive the management data requests sent by the front end device,
    a query mechanism configured to query the database of management information to retrieve data related to the management data requests,
    prepare the management data responses based on the queried management information data, and
    send the management data responses to the front end; wherein:
    the management data requests comprise one of a set of request-response pairs that encapsulate all data associated with a single user request;
    the front end is configured to map each user request to one of the request-response pairs comprising the user request in the request portion and a set of independent requests to the back end for fulfilling the management data request;
    the back end comprises a master back end;
    the architecture further comprises a set of multiple second back ends configured to service all or part of the independent requests based on delegation of the mapped independent requests by the master back end; and
    each back end comprises a processor configured to,
    search specific Remote Monitoring (RMON) data values that are to be used by the back end as a reference point to search further RMON entries,
    retrieve data from cache, RMON agents, RMON tables, and other back ends, depending on availability and freshness of the data to be retrieved,
    intermediate processing of the retrieved data, and encoding response data based on the retrieved data and intermediate processing.

2. The architecture according to claim 1, wherein said back end and the database of management information are maintained on a same network segment.

3. The architecture according to claim 1, wherein said back end device further comprises a cache configured to maintain management query responses from said database, and utilize cached data in preparing the management data responses.

4. The architecture according to claim 1, wherein said front end communication mechanism and said back end communication mechanism are configured to utilize a request/response pairs protocol.

5. The architecture according to claim 1, wherein said front end communication mechanism and said back end communication mechanism are configured to send and accept unsolicited notifications.

6. The architecture according to claim 1, wherein said management system is a network management system.

7. The architecture according to claim 1, wherein said database of management information is an Remote Monitoring (RMON) Management Information Base (MIB).

8. The architecture according to claim 7, wherein said RMON MIB comprises RMON standard MIBs and RMON extension MIBs.

9. The architecture according to claim 1, wherein said front end is a web-based application.

10. The architecture according to claim 1, wherein the request-response pairs are implemented in an efficient protocol consistent with Shannon's information theory.

11. The architecture according to claim 1, wherein each request-response pair is independent of other user request-responses.

12. The architecture according to claim 1, wherein the back end further comprises a software server tier configured to query a management information database to retrieve data related to the management data requests along with determining a set of data required to respond to the management information request.

13. A back end configured to be used in a web-based management application, comprising:
   a communication mechanism configured to receive management data requests from at least one front end device and send management data responses to said at least one front end device;
   a cache; and
   a main processing mechanism connected to said cache and said communication mechanism, and configured to,
   retrieve management data from at least one of said cache and a management information database, and
   utilize the retrieved management data to prepare the management data responses; wherein:
   the management data responses comprise a set of request response pairs prepared by a front end that encapsulates all data from multiple back end data queries, associated with a single user request;
   the front end is configured to map each user request to one of the request-response pairs comprising the user request in the request portion and a set of independent requests to the back end for fulfilling the management data request;
   the back end comprises a master back end;
   the back end further comprises a set of multiple second back ends configured to service all or part of the independent requests based on delegation of the mapped independent requests by the master back end; and
   the master back end and each second back end each comprise a processor configured to,
   search specific Remote Monitoring (RMON) data values that are to be used by the back end as a reference point to search further RMON entries,
   retrieve data from cache, RMON agents, RMON tables, and other back ends, depending on availability and freshness of the data to be retrieved,
   intermediate processing of the retrieved data, and
   encoding response data based on the retrieved data and intermediate processing.

14. The back end according to claim 13, wherein said communication mechanism is located on a same segment of a network as a management information base.

15. The back end according to claim 14, wherein said management information base is an Remote Monitoring (RMON) Management Information Base (MIB).

16. The back end according to claim 13, wherein the main processing mechanism is further configured to encode Simple Network Management Protocol (SNMP) requests to retrieve Remote Monitoring (RMON) related data from a management information base.

17. The back end according to claim 13, wherein the front end is a browser based network management application.

18. The back end according to claim 13, wherein said main processing mechanism is further configured to use cached data and new data retrieved from the management information database to determine rate information requested by the management data requests.

19. The back end according to claim 13, wherein said main processing unit is further configured to distribute the received management data requests to other back ends.

20. The back end according to claim 19, wherein said main processing unit is located on a segment, labeled segment A, of a network, and said other back ends are located on segments other than segment A.

21. The back end according to claim 13, wherein said main processing unit is further configured to retrieve management data from multiple management information databases selected based on the management data request.

22. A method of providing management information to a front end device, comprising the steps of:
   receiving a management information request at a master back end;
   determining a set of data required to respond to the management information request;
   querying a cache for parts of said data set are maintained in said cache;
   querying a remote database for parts of said data set either not maintained in said cache or maintained in said cache but stale; and
   preparing a response to said management information request; and
   sending the response to said front end device; wherein:
   the front end is configured to map each user request to one of the request-response pairs comprising the user request in the request portion and a set of independent requests to the back end for fulfilling the management data request;
   the back end comprises a master back end;
   the architecture further comprises a set of multiple second back ends configured to service all or part of the independent requests based on delegation of the mapped independent requests by the master back end; and
   each back end comprises a processor configured to,
   search specific Remote Monitoring (RMON) data values that are to be used by the back end as a reference point to search further RMON entries,
   retrieve data from cache, RMON agents, RMON tables, and other back ends, depending on availability and freshness of the data to be retrieved,
   intermediate processing of the retrieved data, and
   encoding response data based on the retrieved data and intermediate processing.

23. The method according to claim 22, wherein said step of preparing comprises the step of performing at least one of associating, joining, and aggregating data retrieved from at least one of said cache and said database.

24. The method according to claim 22, wherein said step of querying a remote database comprises the step of preparing a Remote Monitoring (RMON) Simple Network Management Protocol (SNMP) get to retrieve the data parts from said database.

25. The method according to claim 22, wherein said management information request is one part of a set of paired request/response protocol.

26. The method according to claim 22, wherein said step of querying a remote database comprises querying multiple remote databases to determine the parts of said data needed to respond to said management information request.

27. The method according to claim 22, further comprising the step of updating the cache based on the query responses from said remote database.

28. The method according to claim 22, wherein said step of preparing includes the step of preparing a response including data describing network traffic from applications, application protocols, and hosts on a network.

29. The method according to claim 22, wherein:

said step of determining comprises determining data from one request-response pair comprising a user request in the request portion of the management information request and a set of independent requests to the master back end for fulfilling the user request;

the request-response pairs are implemented in an efficient protocol consistent with Shannon's information theory;

each request-response pair is independent of other request-response pairs; and the step of preparing a response comprises preparing a response at the master back end recipient of the management information request that delegates collection of the data to the multiple second back ends configured to service all or part of the set of independent requests based on delegation of the independent requests by the master back end.

* * * * *